(12) United States Patent
Dettinger et al.

(10) Patent No.: US 8,095,553 B2
(45) Date of Patent: Jan. 10, 2012

(54) SEQUENCE SUPPORT OPERATORS FOR AN ABSTRACT DATABASE

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 11/083,208

(22) Filed: Mar. 17, 2005

(65) Prior Publication Data

US 2006/0212418 A1    Sep. 21, 2006

(51) Int. Cl.
*G06F 7/00* (2006.01)
*G06F 17/30* (2006.01)

(52) U.S. Cl. .................. 707/759; 707/763; 707/805
(58) Field of Classification Search .................. 707/758, 707/759, 763, 805
See application file for complete search history.

(56) References Cited

U.S. PATENT DOCUMENTS

| | | | |
|---|---|---|---|
| 5,253,362 A | 10/1993 | Nolan et al. | |
| 5,345,586 A | 9/1994 | Hamala et al. | |
| 5,404,510 A | 4/1995 | Smith et al. | |
| 5,418,950 A | 5/1995 | Li et al. | |
| 5,471,611 A | 11/1995 | McGregor | |
| 5,515,488 A | 5/1996 | Hoppe et al. | |
| 5,584,024 A * | 12/1996 | Shwartz | 707/4 |
| 5,630,121 A | 5/1997 | Braden-Harder et al. | |
| 5,734,887 A | 3/1998 | Kingberg et al. | |
| 5,809,497 A | 9/1998 | Freund et al. | |
| 5,870,559 A | 2/1999 | Leshem et al. | |
| 5,918,232 A | 6/1999 | Pouschine et al. | |
| 5,958,008 A | 9/1999 | Pogrebisky et al. | |
| 5,999,933 A | 12/1999 | Mehta | |
| 6,003,034 A | 12/1999 | Tuli | |
| 6,009,422 A | 12/1999 | Ciccarelli | |
| 6,061,506 A | 5/2000 | Wollaston et al. | |
| 6,233,586 B1 | 5/2001 | Chang et al. | |
| 6,397,223 B1 | 5/2002 | Kori | |
| 6,442,543 B1 | 8/2002 | Snodgrass et al. | |
| 6,457,009 B1 | 9/2002 | Bollay | |
| 6,460,043 B1 | 10/2002 | Tabbara et al. | |
| 6,484,162 B1 | 11/2002 | Edlund et al. | |
| 6,546,388 B1 | 4/2003 | Edlund et al. | |
| 6,553,368 B2 | 4/2003 | Martin et al. | |
| 6,578,027 B2 | 6/2003 | Cambot et al. | |
| 6,581,054 B1 | 6/2003 | Bogrett | |
| 6,601,065 B1 | 7/2003 | Nelson et al. | |
| 6,609,123 B1 | 8/2003 | Cazemier et al. | |
| 6,618,727 B1 | 9/2003 | Wheeler et al. | |

(Continued)

OTHER PUBLICATIONS

U.S. Appl. No. 10/083,075, "Application Portability and Extensibility Through Database Schema and Query Abstraction", filed Feb. 26, 2002.

(Continued)

*Primary Examiner* — Robert Timblin
*Assistant Examiner* — Mariela D Reyes
(74) *Attorney, Agent, or Firm* — Patterson & Sheridan LLP

(57) ABSTRACT

The present invention generally provides methods, systems and articles of manufacture that provide a database query application that allows user to compose an abstract query that includes a sequence operator. In one embodiment, sequence operators are used to specify which data elements, from a sequence of data elements, should be retrieved for an abstract query. In another embodiment, a sequence operator may be used to specify that a condition included in an abstract query should be evaluated against particular data elements of the sequence.

23 Claims, 13 Drawing Sheets

U.S. PATENT DOCUMENTS

| | | | |
|---|---|---|---|
| 6,633,817 B1 | 10/2003 | Walker et al. | |
| 6,643,633 B2 | 11/2003 | Chau et al. | |
| 6,647,382 B1 | 11/2003 | Saracco | |
| 6,651,055 B1 | 11/2003 | Kilmer et al. | |
| 6,725,225 B1 | 4/2004 | Kori | |
| 6,725,227 B1* | 4/2004 | Li | 707/102 |
| 6,745,178 B1 | 6/2004 | Emens et al. | |
| 6,772,150 B1 | 8/2004 | Whitman et al. | |
| 6,795,825 B2 | 9/2004 | Rishe | |
| 6,803,927 B1 | 10/2004 | Sahoo | |
| 6,820,076 B2 | 11/2004 | Bailey et al. | |
| 6,928,431 B2 | 8/2005 | Dettinger et al. | |
| 6,954,748 B2 | 10/2005 | Dettinger et al. | |
| 6,978,324 B1 | 12/2005 | Black | |
| 6,985,912 B2 | 1/2006 | Mullins et al. | |
| 6,996,558 B2 | 2/2006 | Dettinger et al. | |
| 7,003,730 B2 | 2/2006 | Dettinger et al. | |
| 7,024,425 B2 | 4/2006 | Krishnaprasad et al. | |
| 7,054,877 B2 | 5/2006 | Dettinger et al. | |
| 7,096,217 B2 | 8/2006 | Dettinger et al. | |
| 7,096,229 B2 | 8/2006 | Dettinger et al. | |
| 7,139,774 B2 | 11/2006 | Dettinger et al. | |
| 7,146,376 B2 | 12/2006 | Dettinger et al. | |
| 7,213,017 B2 | 5/2007 | Rys et al. | |
| 7,249,118 B2 | 7/2007 | Sandler et al. | |
| 7,263,517 B2 | 8/2007 | Sheu et al. | |
| 7,321,895 B2 | 1/2008 | Dettinger et al. | |
| 7,333,981 B2 | 2/2008 | Dettinger et al. | |
| 7,343,365 B2 | 3/2008 | Farnham et al. | |
| 7,363,287 B2 | 4/2008 | Kilmer et al. | |
| 7,383,255 B2 | 6/2008 | Desai et al. | |
| 7,461,052 B2 | 12/2008 | Dettinger et al. | |
| 7,480,648 B2 | 1/2009 | Adams et al. | |
| 7,519,577 B2 | 4/2009 | Brundage et al. | |
| 7,539,662 B2 | 5/2009 | Dettinger et al. | |
| 7,624,097 B2 | 11/2009 | Dettinger et al. | |
| 7,668,806 B2 | 2/2010 | Liu et al. | |
| 7,818,347 B2 | 10/2010 | Dettinger et al. | |
| 7,818,348 B2 | 10/2010 | Dettinger et al. | |
| 2001/0047270 A1 | 11/2001 | Gusick et al. | |
| 2002/0026630 A1 | 2/2002 | Schmidt et al. | |
| 2002/0046281 A1 | 4/2002 | Cope | |
| 2002/0078045 A1* | 6/2002 | Dutta | 707/7 |
| 2002/0078068 A1 | 6/2002 | Krishnaprasad et al. | |
| 2002/0091702 A1 | 7/2002 | Mullins | |
| 2002/0091990 A1 | 7/2002 | Little et al. | |
| 2003/0014399 A1 | 1/2003 | Hansen et al. | |
| 2003/0046385 A1 | 3/2003 | Vincent | |
| 2003/0046390 A1 | 3/2003 | Ball et al. | |
| 2003/0061209 A1* | 3/2003 | Raboczi et al. | 707/3 |
| 2003/0061215 A1 | 3/2003 | Messina | |
| 2003/0144994 A1 | 7/2003 | Wen et al. | |
| 2003/0163455 A1 | 8/2003 | Dettinger et al. | |
| 2003/0167274 A1 | 9/2003 | Dettinger et al. | |
| 2003/0169284 A1 | 9/2003 | Dettinger et al. | |
| 2003/0172056 A1 | 9/2003 | Dettinger et al. | |
| 2003/0214525 A1 | 11/2003 | Esfahany | |
| 2003/0217033 A1 | 11/2003 | Sandler et al. | |
| 2003/0220893 A1 | 11/2003 | Dettinger et al. | |
| 2004/0039736 A1 | 2/2004 | Kilmer et al. | |
| 2004/0039820 A1 | 2/2004 | Colby et al. | |
| 2004/0048233 A1 | 3/2004 | Matthews et al. | |
| 2004/0059746 A1 | 3/2004 | Error et al. | |
| 2004/0148278 A1 | 7/2004 | Milo et al. | |
| 2004/0158567 A1 | 8/2004 | Dettinger et al. | |
| 2004/0260685 A1 | 12/2004 | Pfleiger et al. | |
| 2004/0260691 A1 | 12/2004 | Desai et al. | |
| 2004/0267760 A1 | 12/2004 | Brundage et al. | |
| 2005/0004911 A1* | 1/2005 | Goldberg et al. | 707/7 |
| 2005/0076015 A1 | 4/2005 | Dettinger et al. | |
| 2005/0193114 A1 | 9/2005 | Colby et al. | |
| 2005/0267760 A1 | 12/2005 | Meyer et al. | |
| 2006/0010127 A1 | 1/2006 | Dettinger et al. | |
| 2006/0047638 A1 | 3/2006 | Dettinger et al. | |
| 2006/0053142 A1 | 3/2006 | Sebbane | |
| 2006/0095457 A1 | 5/2006 | Glasspool et al. | |
| 2006/0122993 A1 | 6/2006 | Dettinger et al. | |
| 2006/0136382 A1 | 6/2006 | Dettinger et al. | |
| 2006/0136469 A1 | 6/2006 | Dettinger et al. | |
| 2006/0136470 A1 | 6/2006 | Dettinger et al. | |
| 2006/0155692 A1 | 7/2006 | Dettinger et al. | |
| 2006/0161521 A1 | 7/2006 | Dettinger et al. | |
| 2008/0091668 A1 | 4/2008 | Dettinger et al. | |
| 2009/0182708 A1 | 7/2009 | Dettinger et al. | |
| 2010/0076961 A1 | 3/2010 | Dettinger et al. | |

OTHER PUBLICATIONS

U.S. Appl. No. 10/403,356, "Dealing with Composite Data Through Data Model Entities", filed Mar. 31, 2003.

U.S. Appl. No. 11/035,710, "Timeline Condition Support for an Abstract Database", filed Jan. 14, 2005.

U.S. Appl. No. 11/005,418, "Abstract Query Plan", filed Dec. 6, 2004.

Batory et al., "Implementing a Domain Model for Data Structures[1,2]," *International Journal of Software Engineering and Knowledge Engineering*, Sep. 1992, vol.2(3): pp. 375-402.

Braunmüller et al., "Multiple Similarity Queries: A Basic DBMS Operation for Mining in Metric Databases," *IEEE Transactions on Knowledge and Data Engineering*, Jan./Feb. 2001, vol. 13(1): pp. 79-95.

Franconi et al., "A Data Warehouse Conceptual Data Model for Multidimensional Aggregation," *Proceedings of the International Workshop on Design and Management of Data Warehouses (DMDW '99)*, 1999: pp. 13-1-13-10.

Llama, "Search Code: Search Your Database," <http://www.codewalkers.com/c/a/Search-Code/Search-Your-Database/>, retrieved Mar. 23, 2009, pp. 1-4.

Meng et al., "A Theory of Translation From Relational Queries to Hierarchical Queries," *IEEE Transactions on Knowledge and Data Engineering*, Apr. 1995, vol. 7(2): pp. 228-245.

Office Action History for U.S. Appl. No. 10/083,075 from Nov. 26, 2004 to Sep. 1, 2005.

Office Action History for U.S. Appl. No. 11/226,181 from Mar. 25, 2009 to Aug. 10, 2010.

Office Action History for U.S. Appl. No. 10/403,356 from Sep. 20, 2005 to Jan. 12, 2006.

Office Action History for U.S. Appl. No. 11/360,353 from Feb. 21, 2008 to Jan. 21, 2009.

Office Action History for U.S. Appl. No. 11/005,435 from Feb. 23, 2007 to Aug. 8, 2008.

Office Action History for U.S. Appl. No. 11/005,418 from Mar. 12, 2007 to Aug. 4, 2008.

Office Action History for U.S. Appl. No. 11/953,935 from Jan. 5, 2010 to Sep. 29, 2010.

Office Action History for U.S. Appl. No. 11/035,710 from Apr. 19, 2007 to Nov. 6, 2007.

Office Action History for U.S. Appl. No. 11/951,675 from Jan. 25, 2010 to Jun. 11, 2010.

Office Action History for U.S. Appl. No. 12/018,132 from Mar. 2, 2010 to Jun. 10, 2010.

Office Action History for U.S. Appl. No. 11/035,563 from Apr. 1, 2009 to Jul. 9, 2009.

Office Action for U.S. Appl. No. 12/625,071 dated Oct. 27, 2010.

Raghavan et al., "On the Reuse of Past Optimal Queries," *Proceedings of the 18th Annual International ACM SIGIR Conference on Research and Development in Information Retrieval*, Association for Computing Machinery, Inc., 1995: pp. 344-350.

Wen et al., "Clustering User Queries of a Search Engine," *Proceedings of the 10th International Conference on World Wide Web*, Association for Computing Machinery, Inc., 2001: pp. 162-168.

Wen et al., "Query Clustering in the Web Context," *Information Retrivial and Clustering*, Kluwer Academic Publishers, W. Wu and H. Xiong (Eds.) 2002: pp. 1-30.

Wen et al., "Query Clustering Using User Logs," *ACM Transactions on Information Systems*, Jan. 2002, vol. 20(1): pp. 59-81.

Office Action of U.S. Appl. No. 12/409,193 dated Apr. 26, 2011.

Jacques Calmet et al., "A generic query-translation framework for a mediator architecture," ICDE '97 Proceedings of the Thirteenth International Conference on Data Engineering, 1997: pp. 434-443.

* cited by examiner

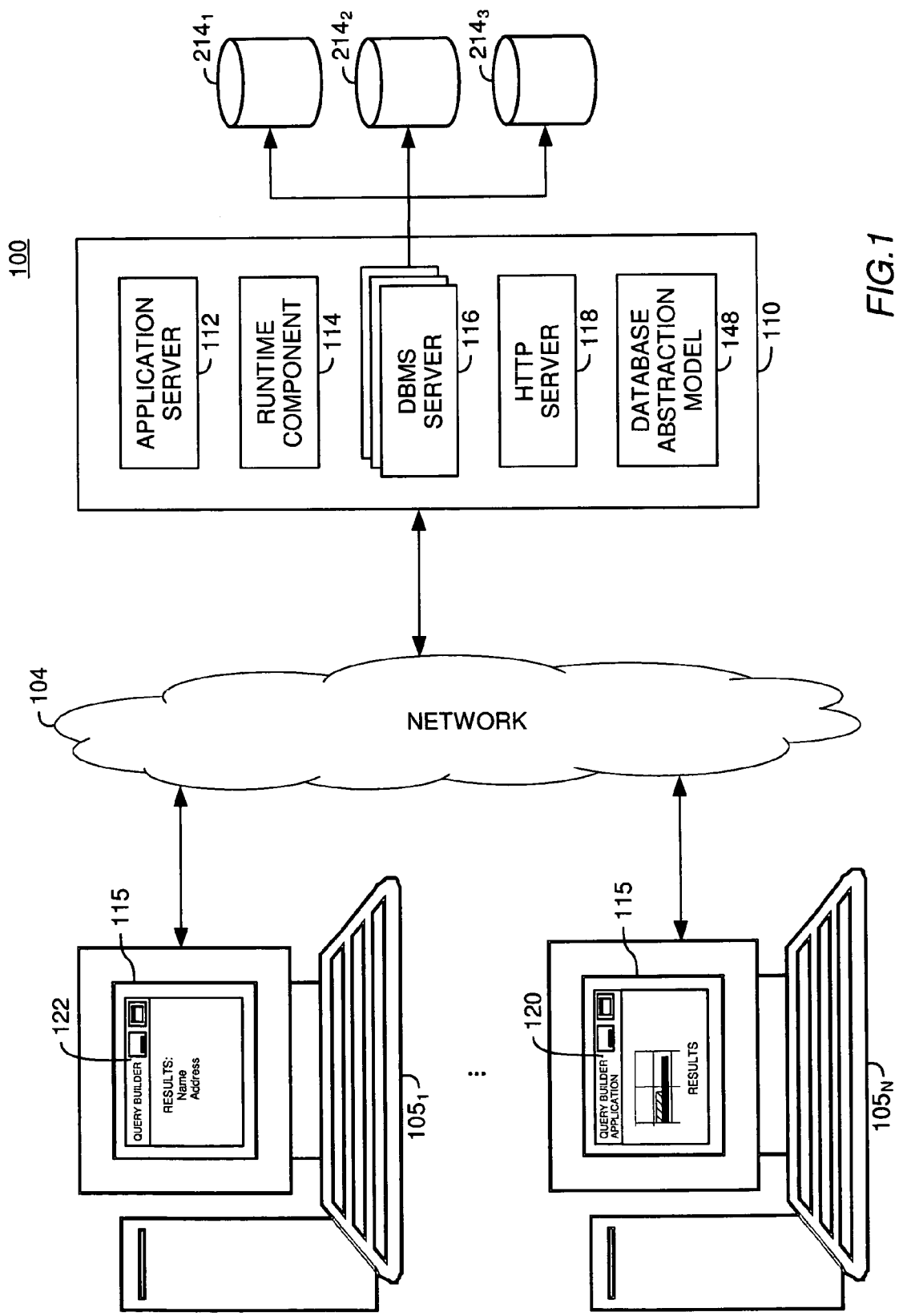

SEQUENCE SUPPORT OPERATORS FOR AN ABSTRACT DATABASE

CROSS-REFERENCE TO RELATED APPLICATIONS

This application is related to a commonly assigned, co-pending, U.S. patent application Ser. No. 10/083,075, filed Feb. 26, 2002, entitled "Application Portability and Extensibility through Database Schema and Query Abstraction," incorporated herein by reference in its entirety. This application is also related to commonly assigned, co-pending U.S. patent application Ser. No. 10/403,356, filed Mar. 31, 2003, entitled "Dealing with Composite Data through Data Model Entities," incorporated herein by reference in its entirety. This application is also related to commonly assigned, U.S. patent application Ser. No. 11/035,710, filed Jan. 14, 2005 entitled, "Timeline Condition Support for an Abstract Database," incorporated herein by reference in its entirety. This application is also related to commonly assigned, co-pending U.S. patent application Ser. No. entitled "Abstract Query Plan," Ser. No. 11/005,418, filed Dec. 6, 2004, which is incorporated by reference herein in its entirety.

BACKGROUND OF THE INVENTION

1. Field of the Invention

The invention generally relates to computer database systems. More specifically, the invention relates to a database abstraction model constructed over an underlying physical database, and to a database query application used to generate queries of the underlying physical database from a query of the database abstraction model.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Each table in a relational database includes a set of one or more columns. A column typically specifies a name and a data type (e.g., integer, float, string, etc). Each cell in a column stores a common element of data. For example, in a table of employee information, each employee's date of hire might be stored in a "hire date" column. Reading across the rows of a table provides a set of data elements from different columns. Tables that share at least one attribute in common are said to be "related." Further, tables without a common attribute may be related through other tables that do share common attributes. A path between two tables is often referred to as a "join," and columns from tables related through a join may be combined to form a new table returned as a set of query results.

Queries may specify which columns to retrieve data from, how to join the columns together, and conditions (predicates) that must be satisfied for a particular data item to be returned in query results. Current relational databases require that queries be composed in complex query languages. One widely used query language is Structured Query Language (SQL), however other query languages are also used. An SQL query is composed from one or more clauses, and well-known SQL clauses include the SELECT, WHERE, FROM, HAVING, ORDER BY, and GROUP BY clauses. Composing a proper SQL query requires that a user understand both the structure and content of the relational database as well as the complex SQL syntax (or other query language).

Users are often interested in the relationships, or the ordering, of otherwise unordered data. For example, a user might desire to identify individuals who have had more than three heart attacks, or to retrieve the first, last, or last five result values of a test administered to a patient. Alternatively, users may wish to specify that query conditions are evaluated only against certain elements of the sequence. For example, a user might desire to identify individuals where one of the last 5 test results was above a specified value. Doing so is useful where data for an entity (e.g., a patient) is available over a long period, but only recent events are relevant in a particular case.

Constructing SQL queries for these scenarios, however, is generally difficult for average users. Doing so requires a query that not only retrieves data that satisfies a condition, but also requires that query specify how results should be ordered, or sequenced, to retrieve the correct results. Columns of a relational database often store data in an unordered fashion, with the rows of a table typically added as they are entered. For example, a column used to store test results does not include an indication of when the test was given, data from other columns must be joined. In addition to a chronological sequence, a user may wish to sequence data by magnitude or using other ordering rules.

Accordingly, it is desirable to provide users with a database query application that includes the ability to query data based on the order, or sequence, of the data.

SUMMARY OF THE INVENTION

The present invention generally provides methods, systems and articles of manufacture that includes a database query application that allows user to compose an abstract query that includes a sequence operator. In one embodiment, sequence operators are used to specify which data elements, from a sequence of data elements, should be retrieved for an abstract query. In another embodiment, a sequence operator may be used to specify that a condition included in an abstract query should be evaluated against particular data elements of the sequence.

One embodiment provides method of providing access to data in a physical database. The method generally includes, providing a database abstraction model that defines a plurality of logical fields that each provide an access method for accessing data elements in the physical database, wherein at least one logical field further provides, metadata indicating a data value used to order the data elements, accessed for the at least one logical field, into an ordered sequence, and providing a query building interface for composing an abstract query from the plurality of logical fields, wherein the abstract query includes a sequence operator for specifying which data elements, from the ordered sequence, should be retrieved for the abstract query. The method generally further includes, providing a runtime component configured to generate, from the abstract query, a resolved query executable against the physical database, wherein the resolved query is configured to retrieve the specified data elements from the ordered sequence.

Another embodiment of the invention provides a computer-readable medium, containing a program which, when executed on a processor performs operations for providing access to data in a database. The operations generally include providing a database abstraction model that defines a plurality of logical fields that each provide an access method for accessing data elements in the physical database, wherein at least one logical field further provides, metadata indicating a data value used to order the data elements, accessed for the at least one logical field, into an ordered sequence, and providing a query building interface for composing an abstract query from the plurality of logical fields, wherein the abstract query includes a sequence operator for specifying which data elements, from the ordered sequence, should be retrieved for the abstract query. The operations generally further include, providing a runtime component configured to generate, from the abstract query, a resolved query executable against the physical database, wherein the resolved query is configured to retrieve the specified data elements from the ordered sequence.

Another embodiment of the invention provides a system. The system generally includes a physical database, a database abstraction model that defines a plurality of logical fields that each provide an access method for accessing data elements in the physical database, wherein at least one logical field further provides, metadata indicating a data value used to order the data elements, accessed for the at least one logical field, into an ordered sequence, a query building interface for composing an abstract query from the plurality of logical fields, wherein the abstract query includes a sequence operator for specifying which data elements, from the ordered sequence, that should be retrieved for the abstract query. The system generally further includes a runtime component configured to generate, from the abstract query, a resolved query executable against the physical database, wherein the resolved query is configured to retrieve the specified data elements from the ordered sequence.

Another embodiment of the invention provides a computer-implemented method of accessing physical data having a particular physical data representation. The computer-implemented method generally includes receiving an abstract query, issued by a requesting entity according to a query specification of the requesting entity; wherein the query specification defines an interface to a data abstraction model defining a plurality of logical field definitions mapping logical fields to the physical data, wherein at least one logical field definition includes metadata indicating a data value used to order a set of data elements, accessed for the at least one logical field, into an ordered sequence of the data elements, and wherein the abstract query is composed on the basis of the plurality of logical field definitions. The method generally further includes, transforming the abstract query into a query consistent with the particular physical data representation according to the data abstraction model depending on which of the plurality of logical fields definitions are referenced by the abstract query, wherein each of the logical field definitions comprises a logical field name, at least one location attribute identifying a location of physical data corresponding to the logical field name, and a reference to an access method selected from at least two different access method types; wherein each of the different access methods types defines a different manner of exposing the physical data corresponding to the logical field name of the respective logical field definition.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof, which are illustrated in the appended drawings.

The appended drawings, however, illustrate only typical embodiments of the invention and are not limiting of its scope, for the invention may admit to other equally effective embodiments.

FIG. 1 illustrates a collection of exemplary computer systems along with a data communications environment used to implement embodiments of the invention.

DETAILED DESCRIPTION OF THE PREFERRED EMBODIMENTS

Figure 2A:
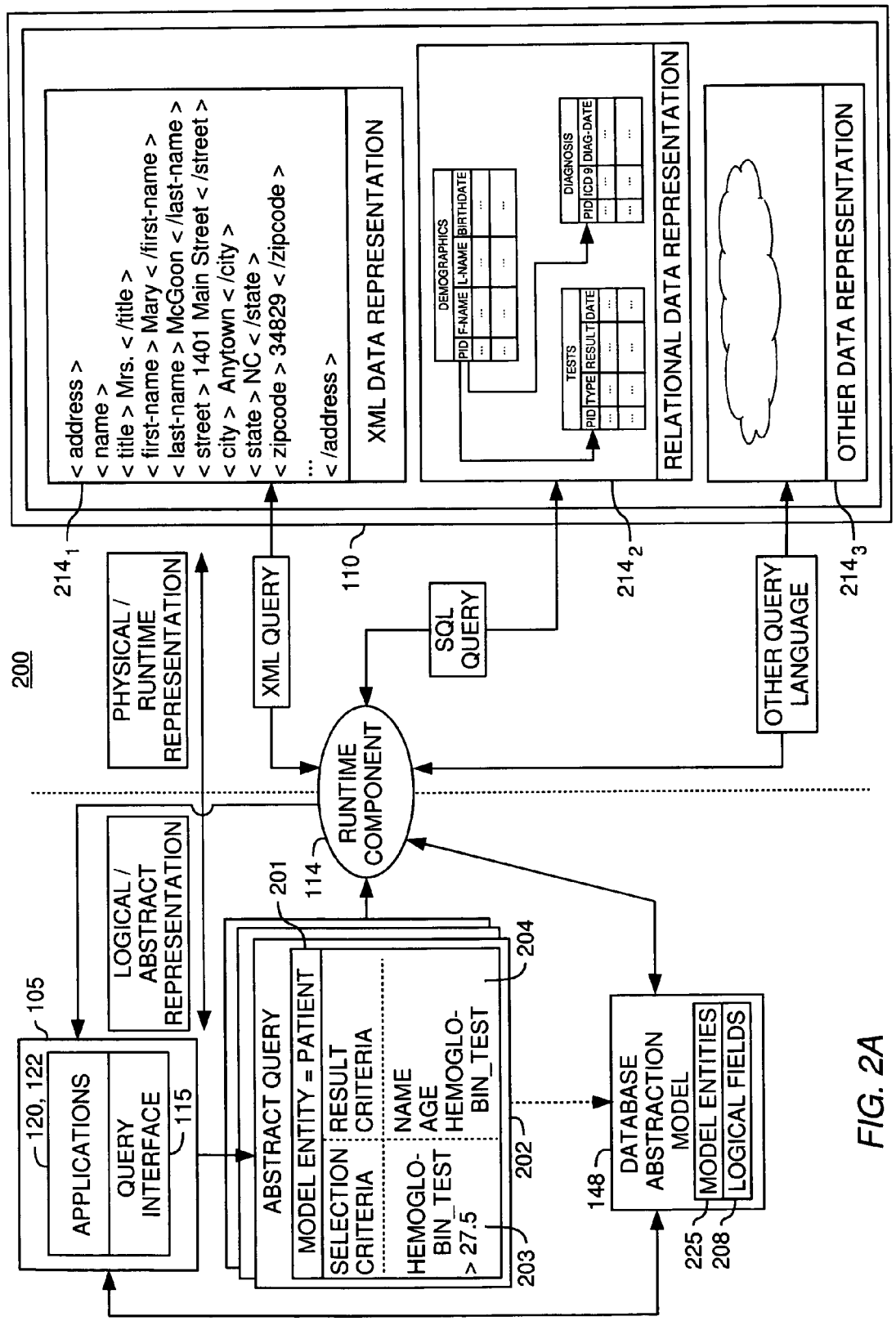
FIG. 2A illustrates a view of the database abstraction model environment along with a view of the physical database environment, according to one embodiment of the invention.

The present invention provides methods, systems, and articles of manufacture allowing users of a database abstraction model to compose abstract queries using sequence operators. Embodiments of the invention further provide support for processing an abstract query that includes such an operator. In one embodiment, sequence operators are used to specify which data elements, from a sequence of data elements, should be retrieved for an abstract query. For example, chronological attributes may be used to sequence data according to when the events represented by the data occurred, or when the data came into being. Alternatively, data may be sequenced according to other attributes, such as the relative magnitude of data elements in the sequence. In another embodiment, a sequence operator may be used to specify that a condition included in an abstract query should be evaluated against particular data elements of the sequence (referred to as a sequence condition).

In particular embodiments, data may be sequenced in three ways: first, an abstract query may specify to retrieve data from a specific position in a sequence, e.g., $1^{st}$, $3^{rd}$, or $187^{th}$. Second, an abstract query may specify to retrieve data from a relative position in a sequence, e.g., first, last, or groups of values such as last five. Third, an abstract query may specify to retrieve a range of values, e.g., $3^{rd}$-$6^{th}$ or $5^{th}$-$9^{th}$. Embodiments of the invention may also provide combinations of sequence-based query operations.

The following description references embodiments of the invention. However, the invention is not limited to any specifically described embodiment. Rather, any combination of the following features and elements, whether related to a described embodiment or not, implements and practices the invention. Furthermore, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims; except where explicitly recited in a claim. Similarly, references to "the invention" shall neither be construed as a generalization of any inventive subject matter disclosed herein nor considered an element or limitation of the appended claims; except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways.

Moreover, examples described herein reference medical research environments. These examples are provided to illustrate embodiments of the invention, as applied to one type of data environment. The techniques of the invention, however, are contemplated for any data environment including, for example, transactional environments, financial environments, research environments, accounting environments, legal environments, and the like.

Database Abstraction Model: Physical View of the Environment

FIG. 1 illustrates a networked computer system in a client/server configuration. Client computer systems 105$_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected via a bus, to memory and storage (not shown). Each client system 105 is running an operating system that manages the interaction between hardware components and higher-level software applications running on client system 105. (e.g., a Linux® distribution, Microsoft Windows®, IBM's AIX® or OS/400®, FreeBSD, and the like) (Linux is a trademark of Linus Torvalds in the United States and elsewhere).

The server system 110 may include hardware components similar to those used by client system 105. Accordingly, the server system 110 generally includes a CPU, a memory, and a storage device, coupled to one another by a bus (not shown). The server system 110 is also running an operating system, (e.g., a Linux® distribution, Microsoft Windows®, IBM's OS/400® or AIX®, FreeBSD, and the like).

The client/server configuration illustrated in FIG. 1, however, is merely exemplary of one hardware/software configuration. Embodiments of the present invention may be implemented using other configurations, regardless of whether the computer systems are complex multi-user computing systems, such as a cluster of individual computers connected by a high-speed network, single-user workstations, or network appliances lacking non-volatile storage. Additionally, although FIG. 1 illustrates computer systems configured in a client/server architecture, embodiments of the invention may be implemented in a single computer system, or in other configurations, including peer-to-peer and distributed architectures.

In one embodiment, users interact with the server system 110 using a graphical user interface (GUI) provided by interface 115. In a particular embodiment, GUI content may comprise HTML documents (i.e., web-pages) rendered on a client computer system 105, using web-browser 122. In such an embodiment, the server system 110 includes a Hypertext Transfer Protocol (HTTP) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system 105$_N$. The web-browser 122 and the application 120 may be configured to allow a user to compose an abstract query, and to submit the query to the runtime component 114.

As illustrated in FIG. 1, server system 110 may further include runtime component 114, DBMS server 116, and database abstraction model 148. In one embodiment, these components may be a software program executing on the server system 110. The DBMS server 116 includes a software application configured to manage databases 214$_{1-3}$. That is, the DBMS server 116 communicates with the underlying physical database system, and manages the physical database environment behind the database abstraction model 148. Users interact with the query interface 115 to compose and submit an abstract query to the runtime component 114 for processing. In turn, the runtime component 114 receives an abstract query and, in response, generates a resolved query of underlying physical databases 214. Accordingly, in one embodiment, the runtime component is configured to generate a physical query (e.g., an SQL statement) from an abstract query. The abstract query itself may be composed from the logical fields defined by the database abstraction model 148. In one embodiment, the runtime component 114 may be configured to use the access method defined for a logical field to generate a physical query of the underlying physical database. Logical fields and access methods are described in greater detail below in reference to FIGS. 2A-2C.

Database Abstraction Model: Logical View of the Environment

FIG. 2A illustrates a plurality of interrelated components of the invention, along with relationships between the logical view of data provided by the database abstraction model environment (the left side of FIG. 2A), and the underlying physical database environment used to store the data (the right side of FIG. 2A).

In one embodiment, the database abstraction model 148 provides definitions for a set of logical fields 208 and model entities 225. Users compose an abstract query 202 by specifying logical fields 208 to include in selection criteria 203 and results criteria 204. An abstract query 202 may also identify a model entity 201 from the set of model entities 225. The resulting query is generally referred to herein as an "abstract query" because it is composed using logical fields 208 rather than direct references to data structures in the underlying physical databases 214. The model entity 225 may be used to indicate the focus of the abstract query 202 (e.g., a "patient", a "person", an "employee", a "test", a "facility" etc).

For example, abstract query 202 includes an indication of that the query is directed to instances of the "patient" model entity 201, and further includes selection criteria 203 indicating that patients with a "hemoglobin_test>27.5" should be retrieved. The selection criteria 203 are composed by specifying a condition evaluated against the data values corresponding to a logical field 208 (in this case the "hemoglobin_test" logical field. The operators in a condition typically include comparison operators such as =, >, <, >=, or, <=, and logical operators such as AND, OR, and NOT. Results criteria 204 indicates that data retrieved for this abstract query 202 includes data for the "name," "age," and "hemoglobin_test" logical fields 208.

In one embodiment, users compose an abstract query 202 using query building interface 115. Rather than query an increasingly specific collection of tables, columns, and rows of the underlying physical database, users compose an abstract query 202 of a selected model entity 201 using the logical fields 208 defined by the database abstraction model 148. The definition for each logical field 208 in the database abstraction model 148 specifies an access method identifying the location of data in the underlying physical database 214. In other words, the access method defined for a logical field provides a mapping between the logical view of data exposed to a user interacting with the interface 115 and the physical view of data understood by the runtime component 114 to retrieve data from the physical databases 214.

Additionally, the database abstraction model 148 may define a set of model entities 225 that may be used as the foundation for an abstract query 202. In one embodiment, users select which model entity to query as part of the query composition process. Model entities are descried below, and further described in commonly assigned, co-pending application Ser. No. 10/403,356, filed Mar. 31, 2003, entitled "Dealing with Composite Data through Data Model Entities," incorporated herein by reference in its entirety.

In one embodiment, the runtime component 114 retrieves data from the physical database 214 by generating a resolved query (e.g., an SQL statement) from the abstract query 202. Because the database abstraction model 148 is not tied to either the schema of the physical database 214 or the syntax of a particular query language, additional capabilities may be provided by the database abstraction model 148 without having to modify the underlying database. Further, depending on the access method specified for a logical field, the runtime component 114 may transform abstract query 202 into an XML query that queries data from database $214_1$, an SQL query of relational database $214_2$, or other query composed according to another physical storage mechanism using other data representation $214_3$, or combinations thereof (whether currently known or later developed).

An illustrative abstract query, corresponding to abstract query 202, is shown in Table I below. In this example, the abstract query 202 is represented using extensible Markup Language (XML). In one embodiment, query building interface 115 may be configured to generate an XML document to represent an abstract query composed by a user. Those skilled in the art will recognize that XML is a well known markup language used to facilitate the sharing of structured text and information. Other markup languages, however, may be used.

TABLE I

Query Example

```
001   <?xml version="1.0"?>
002   <!--Query string representation: ("Hemoglobin_test > 20")
003   <QueryAbstraction>
004       <Selection>
005           <Condition>
006               <Condition field="Hemoglobin Test"
                      operator="GT" value="27.5"
007           </Condition>
008       </Selection>
009       <Results>
010               <Field name="Name"/>
011               <Field name="Age"/>
012               <Field name="hemoglobin_teset"/>
013       </Results>
014       <Entity name="patient">
015           <FieldRef name="data://patient/PatientID" />
016               <Usage type="query" />
017           </EntityField>
018       </Entity>
019   </QueryAbstraction>
```

The XML markup shown in Table I includes the selection criteria 203 (lines 004-008) and the results criteria 204 (lines 009-013). Selection criteria 203 includes a filed name (for a logical field), a comparison operator (=, >, <, etc) and a value expression (what the field is being compared to). In one embodiment, the results criteria 204 include a set of logical fields for which data should be returned. The actual data returned is consistent with the selection criteria 203. Line 14 identifies the model entity selected by a user, in this example, a "patient" model entity 201. Line 15 indicates the identifier in the physical database 214 used to identify instances of the model entity. In this case, instances of the "patient" model entity are identified using values from the "Patient ID" column of a patient table.

Figure 2B:
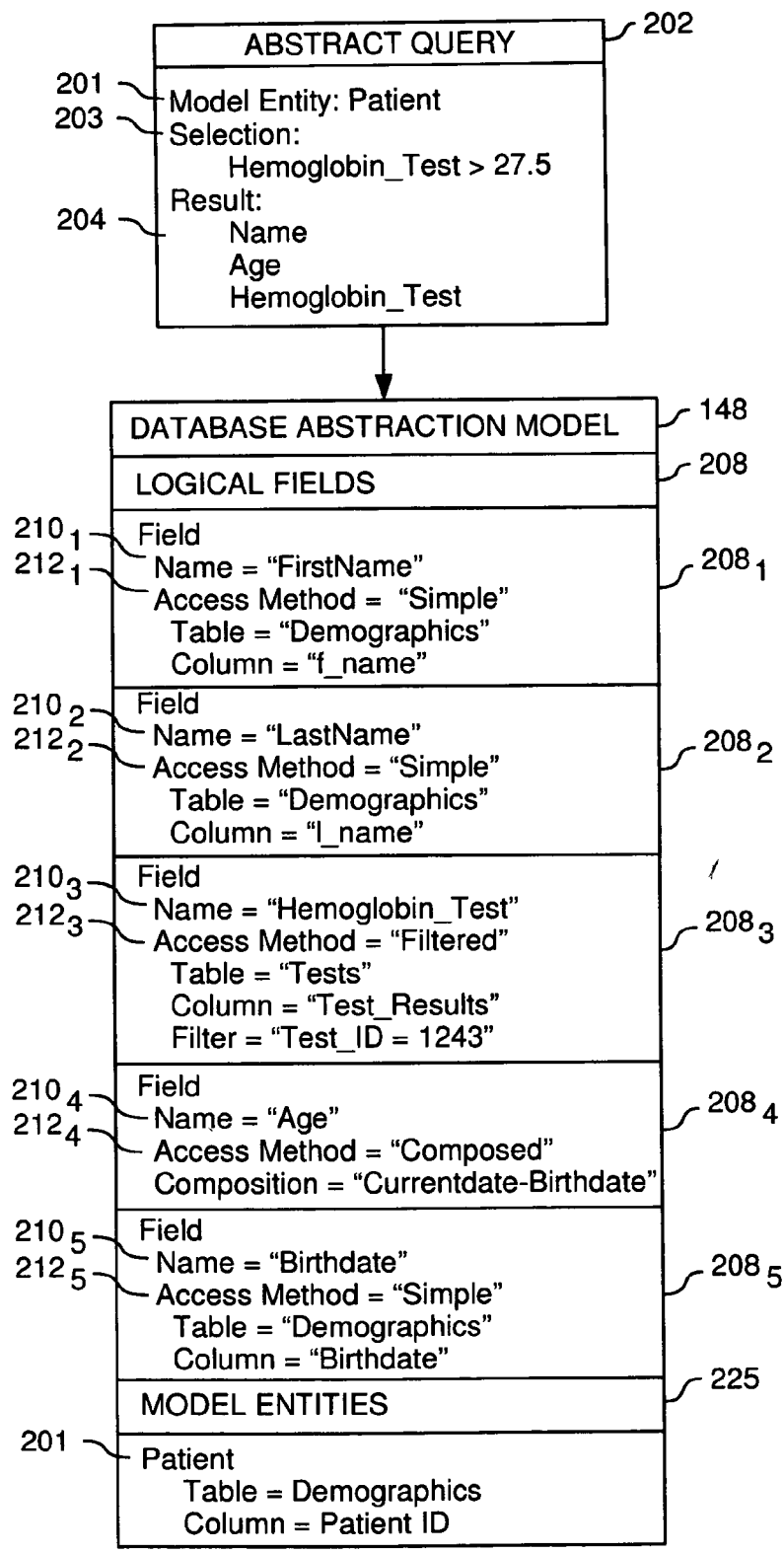
FIGS. 2B-2C illustrate a representation of an abstract query and a database abstraction model, according to one embodiment of the invention.
Figure 2C:
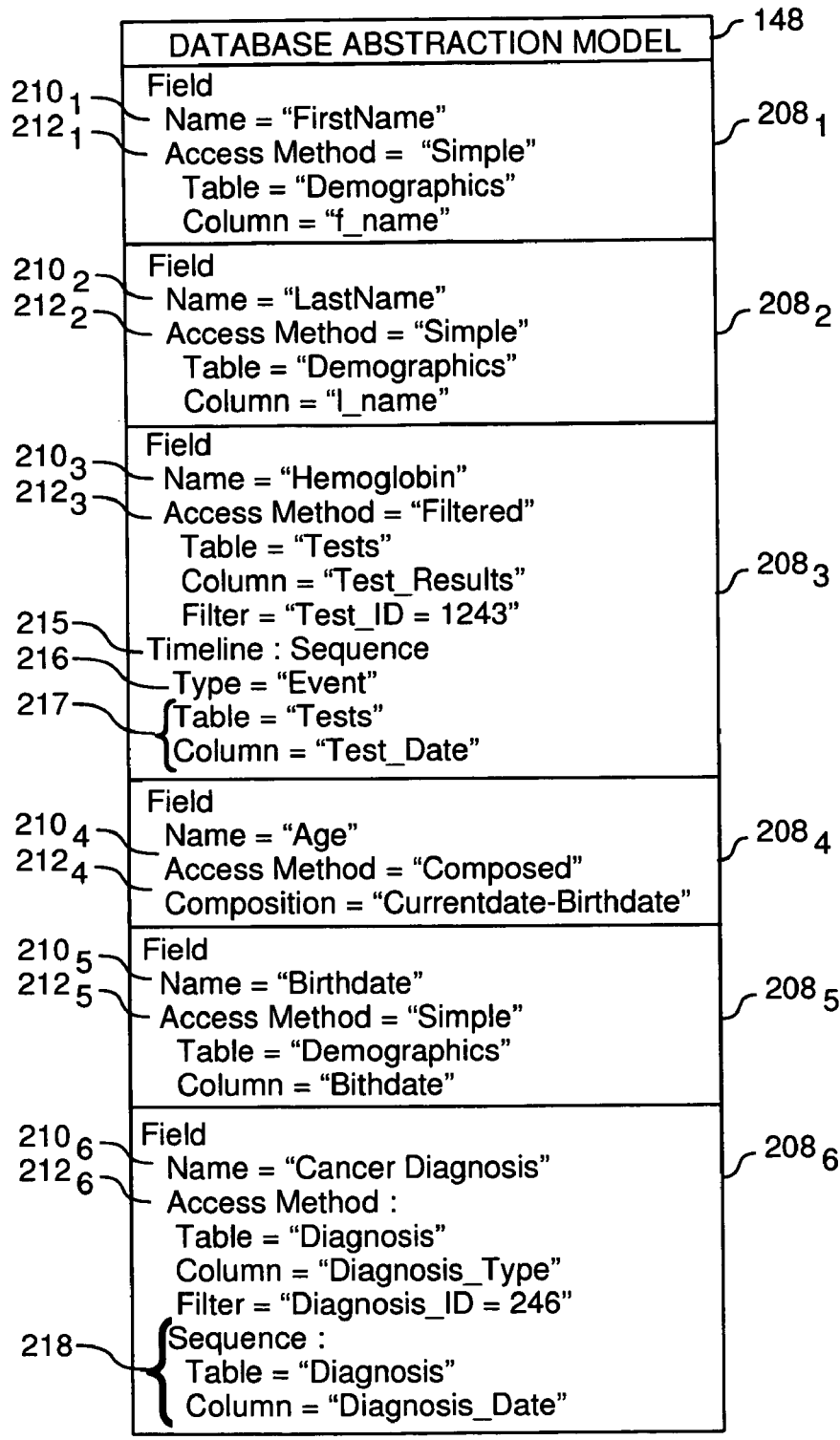

FIGS. 2B and 2C illustrate an exemplary database abstraction model 148 constructed over a physical database (e.g., database $214_2$). The database adstraction model 148 includes a "patient" model entity 201 and a plurality of logical fields 208 used to access data related to instances of the "patient" model entity 201 available in the underlying physical database 214.

FIG. 2B illustrates the abstract query 202 from FIG. 2A, relative to the logical field definitions 208 (or "logical field," for short) provided by the database abstraction model 148. As illustrated, the database abstraction model 148 includes definitions for a plurality of logical fields $208_{1-5}$ (five shown by way of example). The access methods specified by logical fields 208 are used to map from a given logical field 208 to data in an underlying database (e.g., database $214_2$ shown in FIG. 2A).

In one embodiment, each logical field 208 identifies a logical field name $210_{1-5}$ and an associated access method $212_{1-5}$. Depending upon the different types of logical fields, any number of access methods may be supported by the database abstraction model. FIG. 2B illustrates access methods 210 for simple fields, filtered fields, and composed fields. Each of these three access methods are described below.

A simple access method specifies a direct mapping to a particular entity in the underlying physical database. Field specifications $208_1$, $208_2$ and $208_5$ each provide a simple access method, $212_1$, $212_2$, and $212_5$, respectively. For a relational database, the simple access method maps a logical field to a specific database table and column. For example, the simple field access method $212_1$, shown in FIG. 2B maps the logical field name $210_1$, "FirstName" to a column named "f_name" in a table named "Demographics."

Logical field specification $208_3$ exemplifies a filtered field access method $212_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "hemoglobin test." The access method for this filtered field $212_3$ maps to the "Test_Result" column of a "Tests" tests table and defines a filter "Test_ID='1243.'" Only data that satisfies the filter is returned for this logical field. Accordingly, the filtered field $208_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, field access method $212_4$ illustrates a composed access method that maps the logical field "Age" to another logical field $208_5$ named "birthdate." In turn, the logical field "birthdate" $210_5$ maps to a column in the demographics table. In this example, data for the "Age" logical field is computed by retrieving data from the underlying database using the "birthdate" logical field, and subtracting a current date value from the birth date value to calculate an "Age" value returned for the logical field $212_4$. Another example would include the "name" logical field specified in results criteria 204. The "Name" logical field could be composed from a composition operation using data retrieved using the simple access methods of the "First Name" logical field $208_1$ and "Last Name" logical field $208_2$.

By way of example, the field specifications 208 of the database abstraction model 148 shown in FIG. 2B are representative of logical fields mapped to data represented in the relational data representation $214_2$. However, other instances of the database abstraction model 148 or other logical field specifications may map to other physical data representations (e.g., databases $214_1$ or $214_3$ illustrated in FIG. 2A). Further, in one embodiment, the database abstraction model 148 is stored on computer system 110 using an XML document that describes the model entities, logical fields, access methods, and additional metadata that, collectively, define the database abstraction model 148 for a particular physical database system. Other storage mechanisms or markup languages, however, are also contemplated.

FIG. 2C further illustrates the database abstraction model 148 illustrated in FIG. 2B. In FIG. 2C, logical field $208_3$ is modified to include metadata 215 to support sequence operators and sequence conditions. Additionally, logical field $208_6$ is added to the database abstraction model 148 to further illustrate sequence operators and sequence conditions.

In one embodiment, metadata is added to a logical field 208 to support sequence operators that may be included in an abstract query. A sequence operator may be used to specify that a user desires to retrieve a particular data element, from a position within an ordered sequence of data elements. For example, a "last," first", "fifth" (or more generally, "$N^{th}$") data element may be specified. In addition to retrieving a single data element, sequence operators may specify that a range of data elements should be retrieved from an ordered sequence. For example, a sequence operator may be used to specify "last 5," or "$3^{rd}$ through $5^{th}$," data elements should be retrieved.

In another embodiment, metadata added to a logical field 208 may be used to support a sequence condition included in an abstract query. A sequence condition may be used to specify which data elements, from a sequence of data elements, that the condition should be evaluated against, ordered according to the metadata. For example, a sequence condition may be used to specify that the condition: "hemoglobin_test>27.5" should only be evaluated against the "last" value for the hemoglobin test stored in the database. Other examples of sequence conditions include "first," "third," "highest" (for a non-time based sequence), and ranges, e.g., "last 5," or "$3^{rd}$ through $5^{th}$," and the like.

In FIG. 2C, timeline metadata 215 is added to logical field $208_3$. Timeline metadata may be used to order data elements for a logical field according to a chronological sequence. In one embodiment, timeline metadata 215 includes a type metadata 216 and a time-ordering metadata 217. The timeline type metadata 216 (type="Event") indicates that data retrieved for logical field $208_3$ may be ordered into a sequence of discrete events based on the order in which the events occurred, or when the data came into being. The time-ordering metadata 217 specifies where to locate the data used to order data elements for logical field $208_3$ into a sequence. In this example, the time-ordering metadata 217 specifies that data for the "Hemoglobin_Test" logical field $208_3$ may be ordered according dates stored in the "Test_Date" column of the "Test_Results" table of database $214_2$. Additional examples of timeline metadata are described in a commonly owned U.S. patent application Ser. No. 11/035,710, filed Jan. 14, 2005 entitled, "Timeline Condition Support for an Abstract Database," incorporated herein by reference in its entirety.

Similarly, logical field $208_6$, "cancer diagnosis" includes sequence metadata 218. The sequence metadata 218 indicates that data retrieved for the "cancer diagnosis" logical field $208_6$ may be sequenced using the date that a diagnosis occurred. And further indicates that these dates are located in a "Diagnosis" table of database $214_2$ in a "Diagnosis_Date" column. Thus, like timeline metadata 216, sequence metadata 218 may also use the order in which events occurred, when the data came into being, or was added to the database, to order data retrieved for a logical field into an ordered sequence. By ordering events into a sequence, a user may identify individuals who have had more than occurrences of the sequenced event. For example, a user may identify individuals who have had more than three occurrences of a cancer diagnosis by using a sequence operator to identify patients with a fourth occurrence of a cancer diagnosis code using logical field $208_6$.

Additionally, metadata 218 may specify that data retrieved for a logical field 208 may be sequenced using ordering criteria other than chronological criteria. For example, logical fields $208_3$ and $208_6$ could specify that data elements retrieved for the logical field should be sequenced by magnitude (e.g., from highest to lowest). Further, if a logical field 208 does not specify any timeline metadata 215 or sequencing metadata 218, then the runtime component 114 may configured to prompt a user, using well known graphical user interface constructs (e.g., a dialog box) to identify how data retrieved for the logical field should be sequenced for a query condition that includes a sequence operator.

Figure 3A:
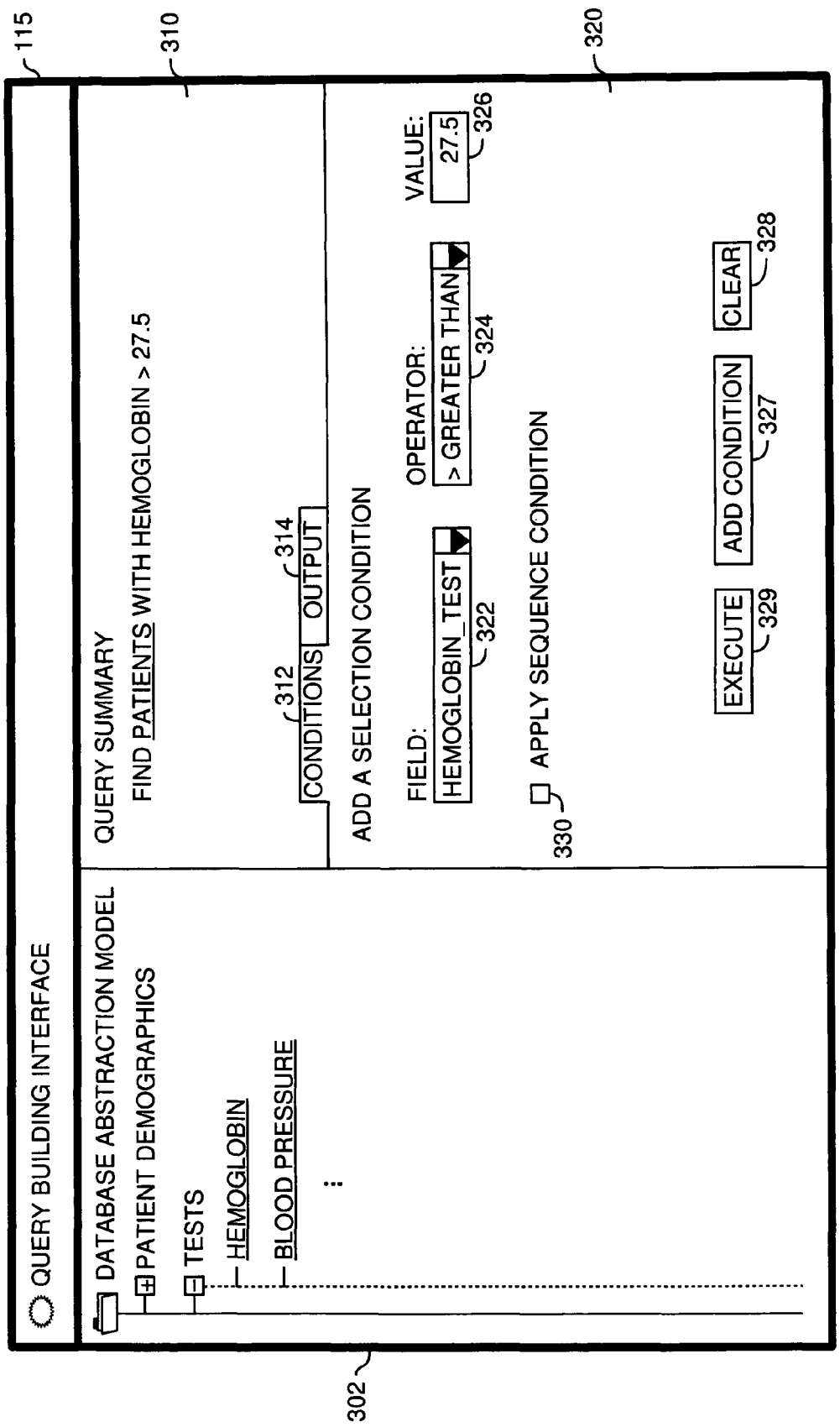
FIGS. 3A-3G illustrate exemplary graphical user interface screens that provide users with sequence operators for composing an abstract query, according to one embodiment of the invention.
Figure 3B:
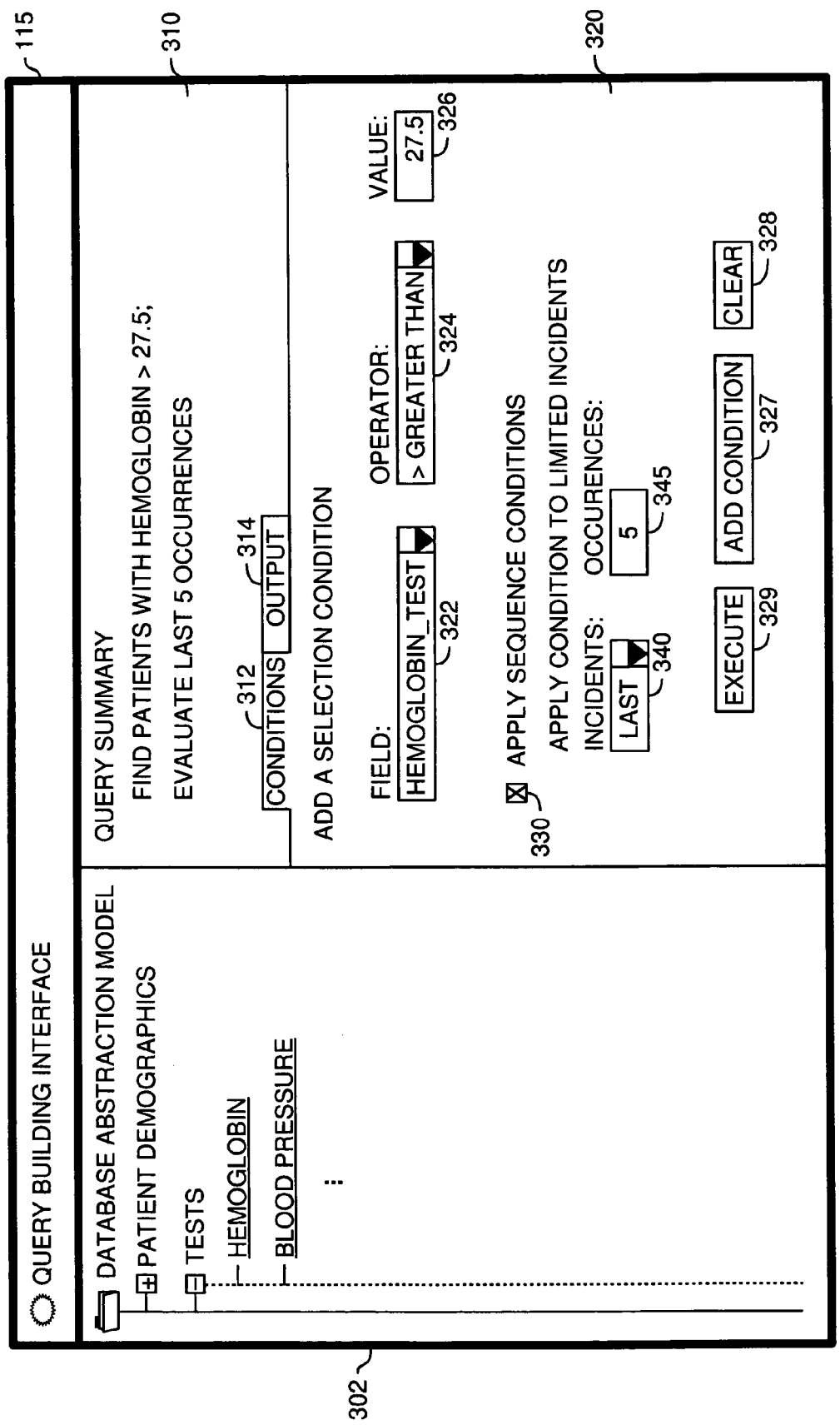
Figure 3C:
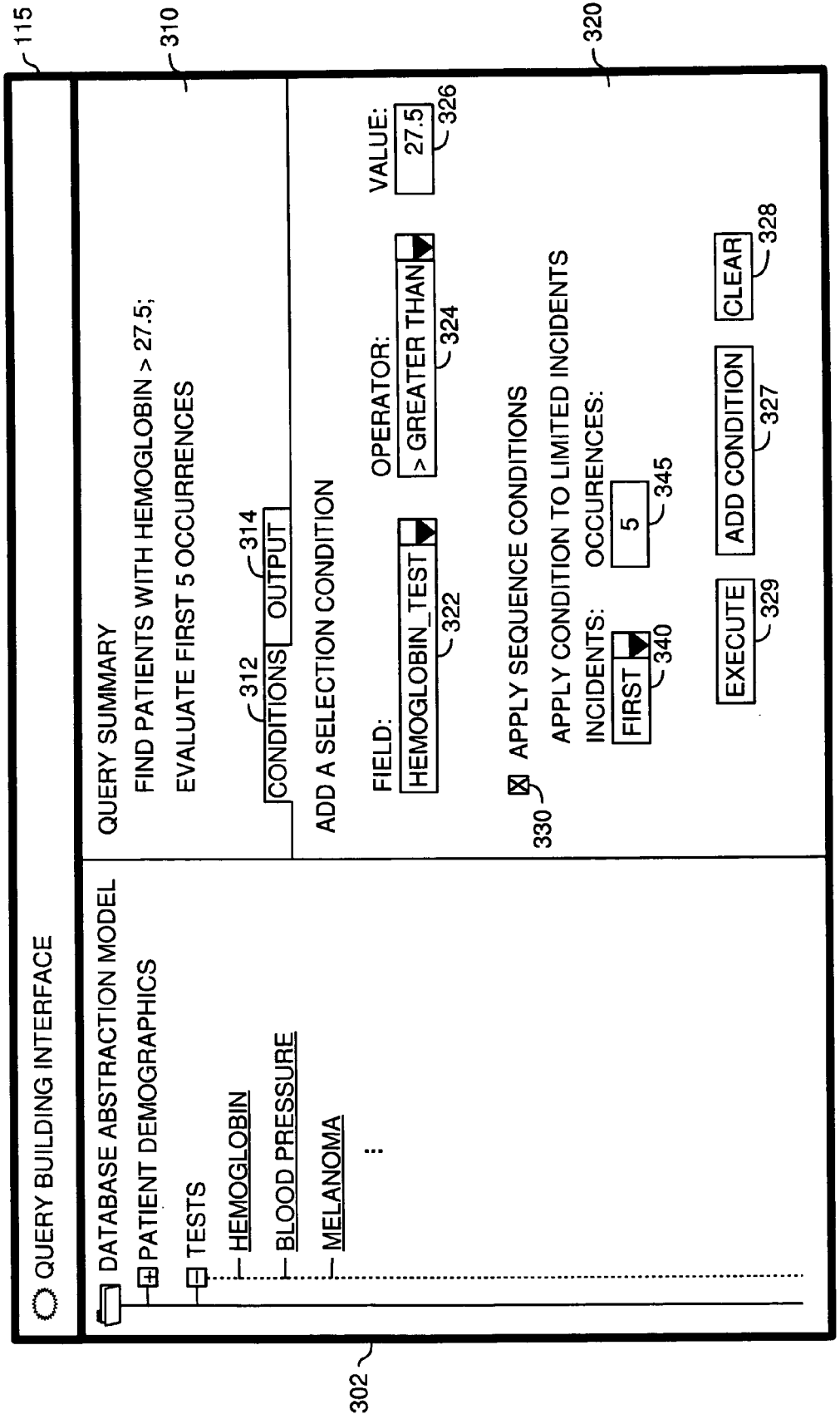
Figure 3D:
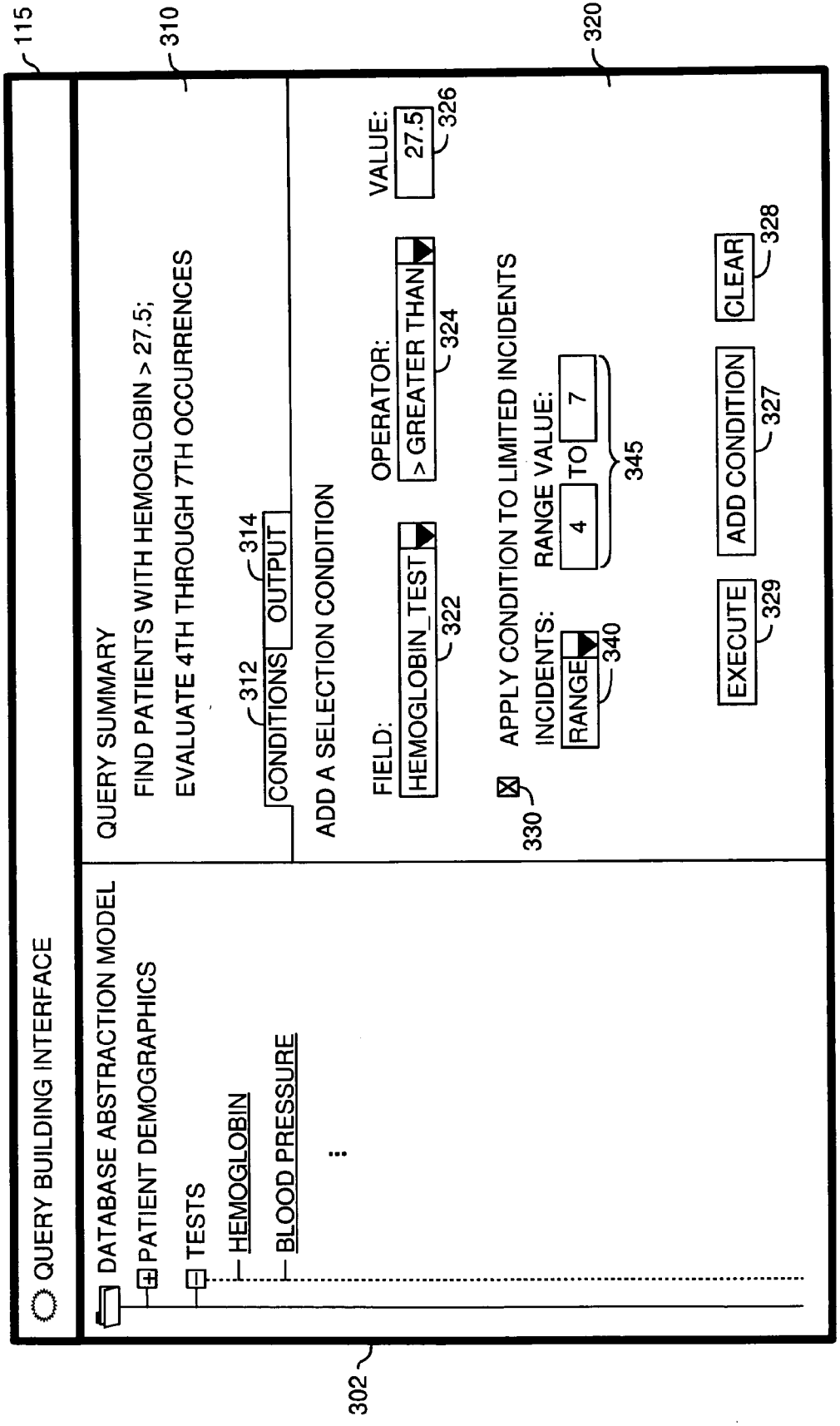
Figure 3E:
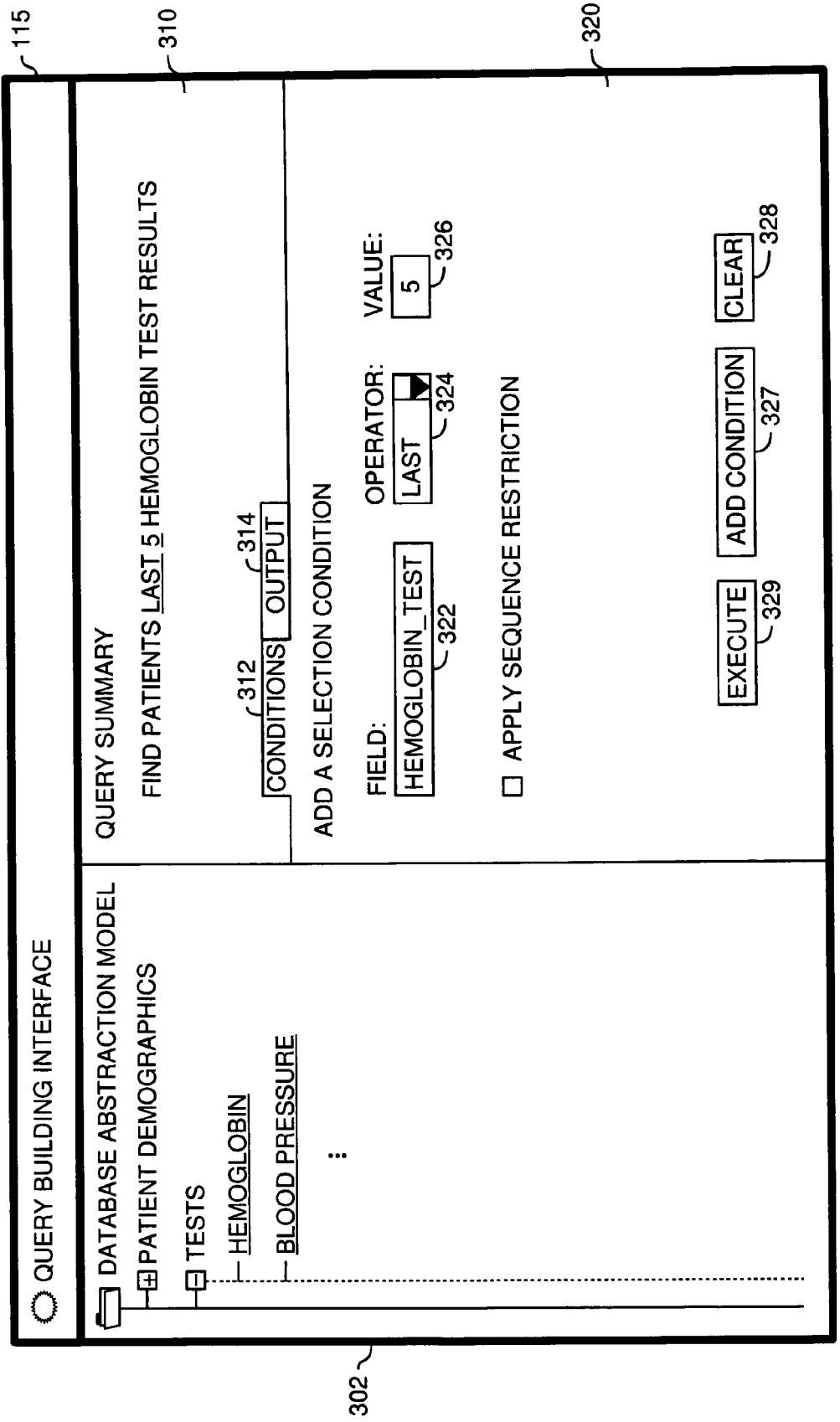
Figure 3F:
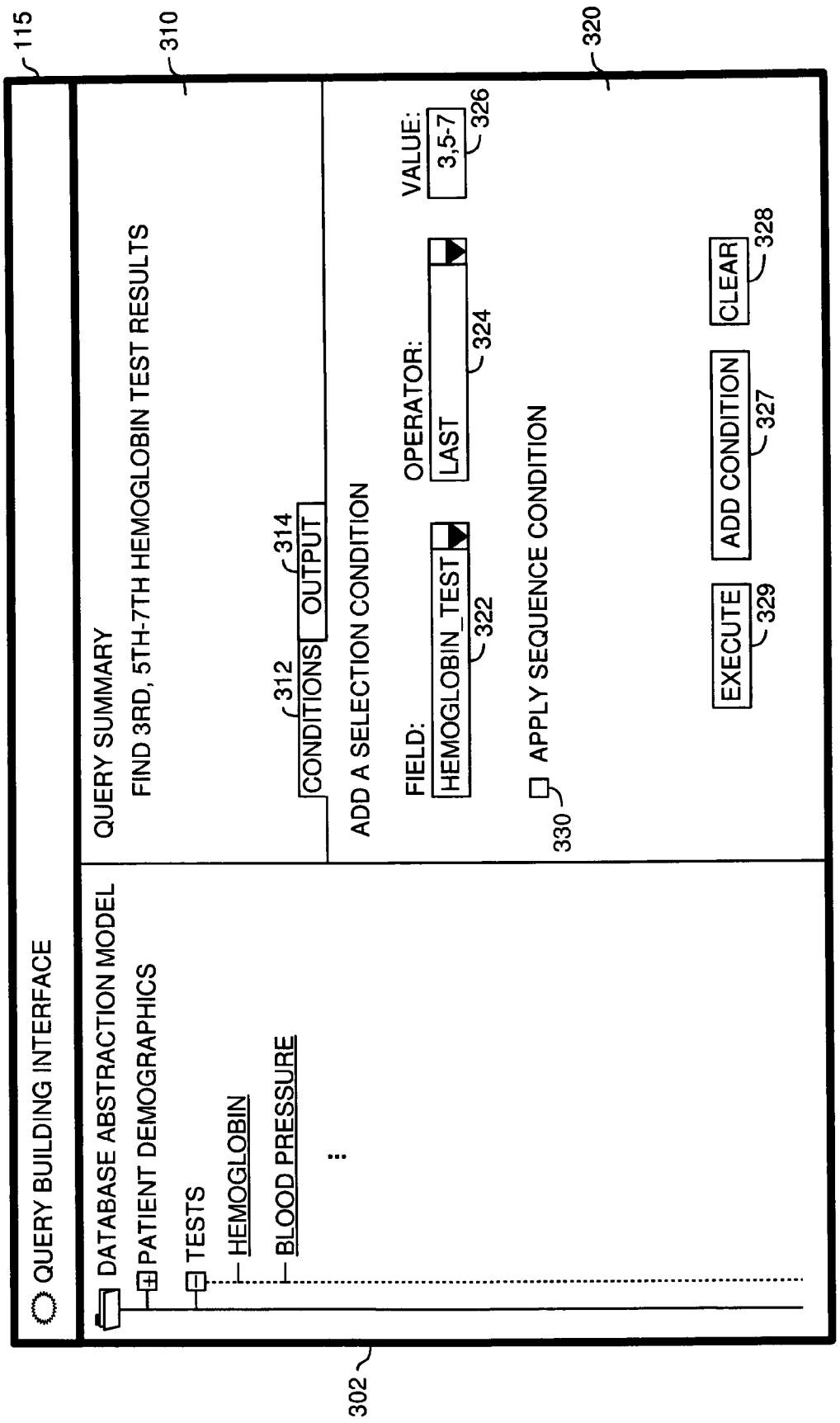

FIGS. 3A-3G illustrate an exemplary graphical user interface screen 300 that provides an interface for including a sequence operator in a query condition, according to one embodiment of the invention. FIGS. 3B-3D illustrate a sequence operator used to specify that query conditions should be evaluated only against certain elements of the sequence, i.e., a sequence condition. FIGS. 3E-3F illustrate a sequence operator used to retrieve specific data elements from an ordered sequence.

FIG. 3A illustrates screen 300 with display area 302 that displays the logical fields 208 for a "patient" model entity, grouped into hierarchal categories. In one embodiment, display area 302 includes the logical fields 208 related to the model entity that a user has selected as the focus for an abstract query. Accordingly, in this example, the logical fields 208 illustrated in display area 302 include logical fields 208 for patient demographics data and for test results data. The query summary section 310 provides an indication of the abstract query as it is constructed by a user interacting with interface 115. Tabs 312 and 314 allow a user to switch between specifying conditions for an abstract query and specifying logical fields 208 that a user desires to include in query results.

Query composition section 320 provides an interface for adding conditions to an abstract query. In one embodiment, a selection condition (e.g., selection criteria 203) includes a field name 322 (for a logical field), a comparison operator (=, >, <, etc) 324 and a value expression 326 (what is the field being compared to). The query composition section 320 illustrates screen 300 after a user has added a selection condition of "Hemoglobin>27.5". In one embodiment, additional conditions may be added to the abstract query using "add condition" button 327 or removed using "clear" button 328. If the abstract query shown in FIG. 2A were executed without additional selection criteria (e.g., by using execute button 329), then all instances of the "patient" model entity that have a hemoglobin test value greater than 27.5 would be retrieved. The actual data displayed for instances of the "patient" model entity may be selected by switching to the query result specification using output tab 314. A user may generate a query result specification (e.g., results criteria 204) by selecting which logical fields 208 from logical field display 302 to display as query results.

In one embodiment, the query building interface 115 may provide a checkbox 330 that may be used to add a sequence condition to an abstract query. As described above, sequence conditions may be used to limit the data elements against which a selection condition is applied to only those data elements specified by the sequence condition. FIG. 3B illustrates query building interface 115 after a user has selected checkbox 330 and specified a sequence condition for the current selection condition of "Hemoglobin_Test>27.5".

In one embodiment, a user may select the data elements against which a sequence condition is evaluated by selecting a sequence operator using drop-down menu 340 and providing a value for text box 345. For example, FIG. 3B illustrates the "Hemoglobin_test>27.5" condition with a sequence condition specifying that the condition should be evaluated against the last five occurrences of the hemoglobin test for a particular instance of the patient model entity.

Other sequence conditions may be specified in an abstract query. For example, single elements from the sequence (e.g., "$1^{st}$," "$2^{nd}$," or "$3^{rd}$" etc.) may be specified by a sequence condition, or a range of data elements may be specified. FIG. 3C illustrates screen 300 using a "first" sequence condition selected using drop down box 340, and FIG. 3D illustrates a "range" of values specified for the sequence condition. The value 345 for a "range" condition includes a beginning value and end value. As illustrated, a range that includes the $4^{th}$ through the $7^{th}$ data elements is specified.

The exemplary screens illustrated in FIGS. 3B-3D illustrate sequence conditions using a chronological aspect of the data. Other sequences, however, are contemplated. For example, sequence operators such as "greatest," "lowest," "highest," "smallest," and the like may be provided to a user of the database abstraction model 148 using embodiments of the invention. Thus, using the results for the "hemoglobin_test" logical field $208_3$, a number of different sequences may be defined for the test results. Sequence conditions that specify a combination of single elements and ranges for value 345 are also contemplated.

In another embodiment, a sequence operator may be used as an operator applied to a logical field in an abstract query, without being related to another condition (as the sequence condition in FIGS. 3D-3D is related to the "hemoglobin>27.5" condition). FIG. 3E illustrates an embodiment using a "last" sequence operator. The field selection 322 is again set to the "Hemoglobin_Test" logical field $208_3$. The operator 324, however, is not an arithmetic or logical operator. Instead, a "last" sequence operator 324 is selected. The value 326 for a sequence operator 324 may be used to specify the first, second, last, or any other data element within a sequence of data elements for a logical field. Further, combinations of individual sequence elements and ranges are contemplated. For example, FIG. 3F illustrates screen 300 where a user has specified a combination of sequence positions for the sequence value 326 associated with sequence operator 324.

Figure 3G:
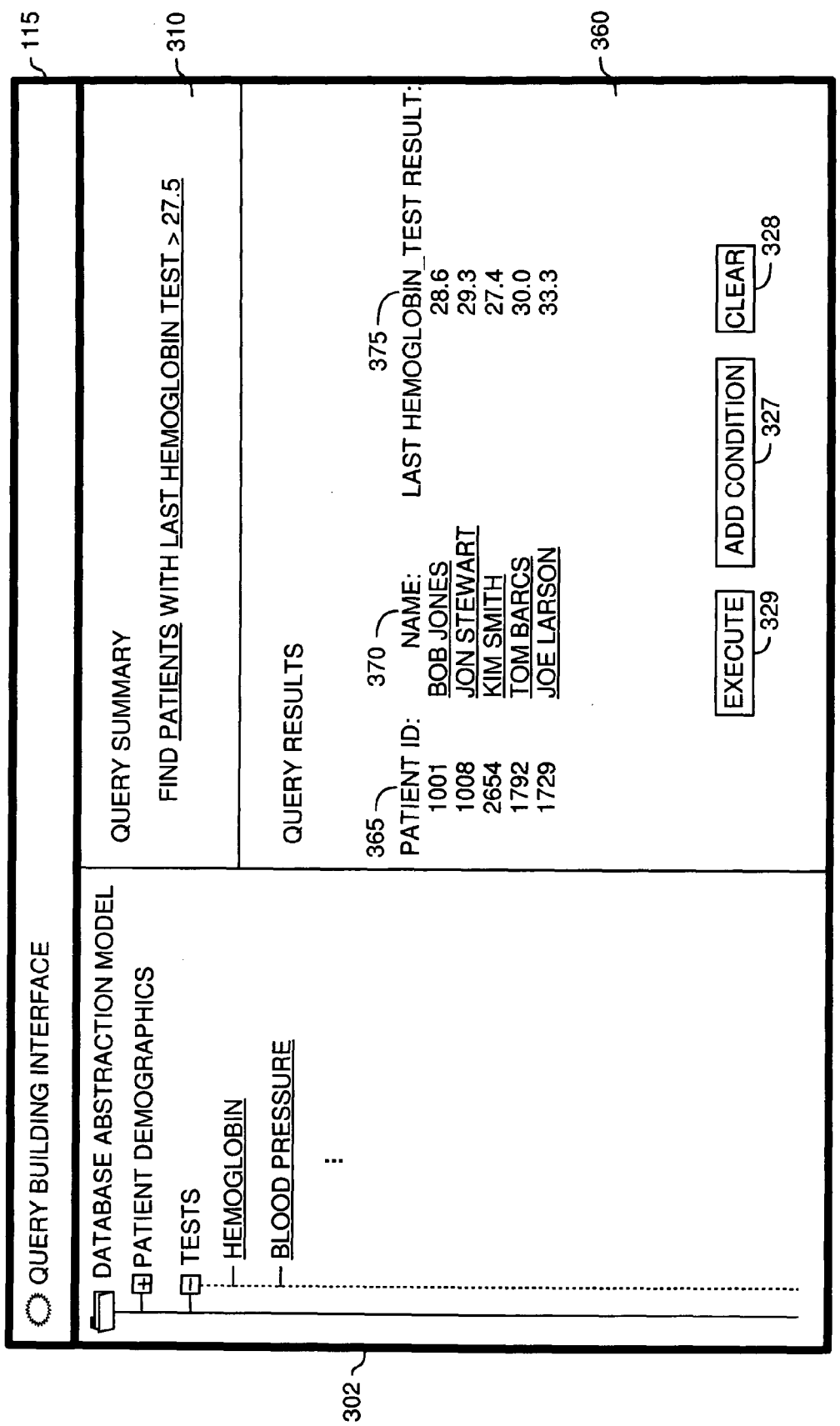

FIG. 3G illustrates a set of query results retrieved for the abstract query illustrated in FIG. 3A; namely, the query: "find patients with a last hemoglobin test value greater than 27.5." In this example, a user has selected to include in the query results a patient ID, a patient name, and the test value for the hemoglobin test by specifying these logical fields in results criteria 204. Accordingly, query results section 360 displays a list of patient IDs 365, patient names 370, and the value for the last hemoglobin test. The data displayed for each instance of the "patient" model entity satisfies the selection condition specified in the abstract query (i.e., the last hemoglobin test recorded in the database has a value greater than 27.5) and the sequence condition In addition, each patient ID 365 is illustrated with an underlined value. This is included to represent an embodiment where query results are displayed with a hyperlink linking to additional data about each individual patient model entity. In one embodiment, the initial query results display the requested data, or a summary of the requested data, and additional information about a model entity retrieved using an abstract query may be accessed using the hyperlink. Thus, for example, by clicking on the hyperlink for "Bob Jones" the interface may request additional data available through the database abstraction model 148 about this instance of the "patient" model entity.

The foregoing exemplary graphical interface screens in FIGS. 3A-3F are included to illustrate embodiments of a query building interface 115 allowing a user to include sequence operators in a query condition and to specify sequence conditions in an abstract query. However, those skilled in the art will recognize that the actual graphical user interface elements included (e.g., buttons, checkboxes, drop-down lists, text boxes, etc) are exemplary, and not required by embodiments of the invention. Other graphical user interface screens may be designed to provide users with an interface for composing an abstract query that includes sequence conditions and sequence operators, including both known and later developed graphical user interface constructs.

Figure 4:
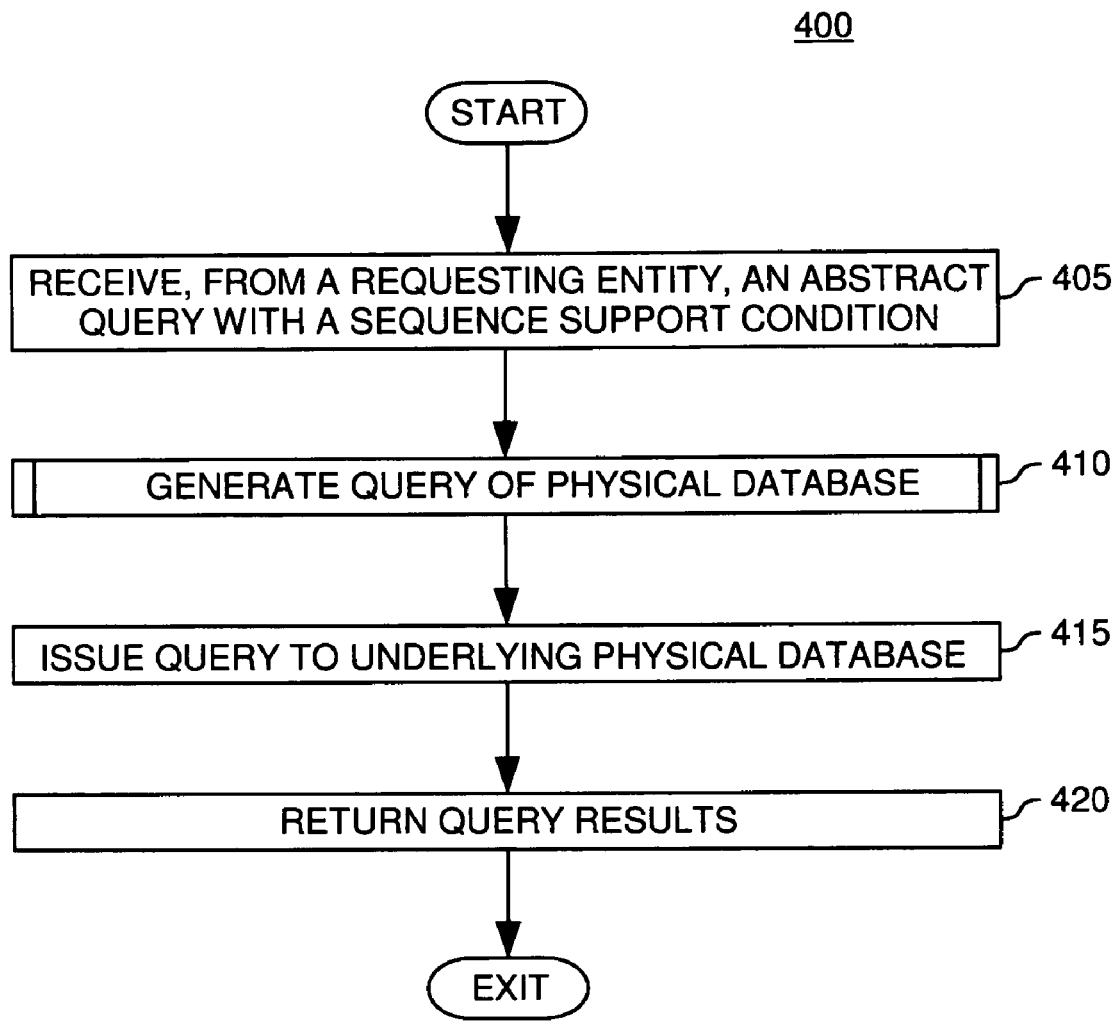
FIG. 4 illustrates a method for processing an abstract query that specifies a sequence operator for at least one of the conditions included in the abstract query, according to one embodiment of the invention.

In one embodiment, completed abstract queries may be submitted to a runtime component 114 that is configured to generate a resolved query and return a set of query results. FIG. 4 illustrates a method for processing an abstract query, according to one embodiment of the invention. Operations 400 may begin at step 405 after a user submits a query for processing. In one embodiment, query building interface 115 may be configured to connect with server computer system 106 using well known network protocols over network 104 to transmit an abstract query to runtime component 114.

At step 410, the runtime component generates a resolved query of the physical database. In one embodiment, the runtime component 114 may be configured to first generate an intermediate representation of the abstract query, such as an abstract query plan. An abstract query plan may include a combination of abstract elements from the data abstraction model 148 and physical elements relating to the underlying physical database 214 each used in the resolved query generation process. For a database abstraction model constructed over a relational database $214_2$, an abstract query plan contains all the information about which relational tables are required to generate a resolved query, and how to join the tables together (i.e., the relationships between the tables or between the logical fields and query conditions). This intermediate representation is used to generate a physical query of the underlying physical database (e.g., an SQL statement(s)). Abstract query plans are further described in a commonly assigned, co-pending application entitled "Abstract Query Plan," Ser. No. 11/005,418, filed Dec. 6, 2004, which is incorporated by reference herein in its entirety. Query processing is further described in co-pending U.S. patent application Ser. No. 10/403,356, filed Mar. 31, 2003, entitled "Dealing with Composite Data through Data Model Entities," incorporated herein by reference in its entirety.

Next, at step 415, the resolved query is executed against the underlying physical database to retrieve a set of query results. At step 420, the retrieved query results may be returned to the requesting entity (e.g., to a user that submitted the query for execution using "Execute" button 329). Query results may be then be rendered on query interface 115 (e.g., the query results displayed in FIG. 3G).

Figure 5:
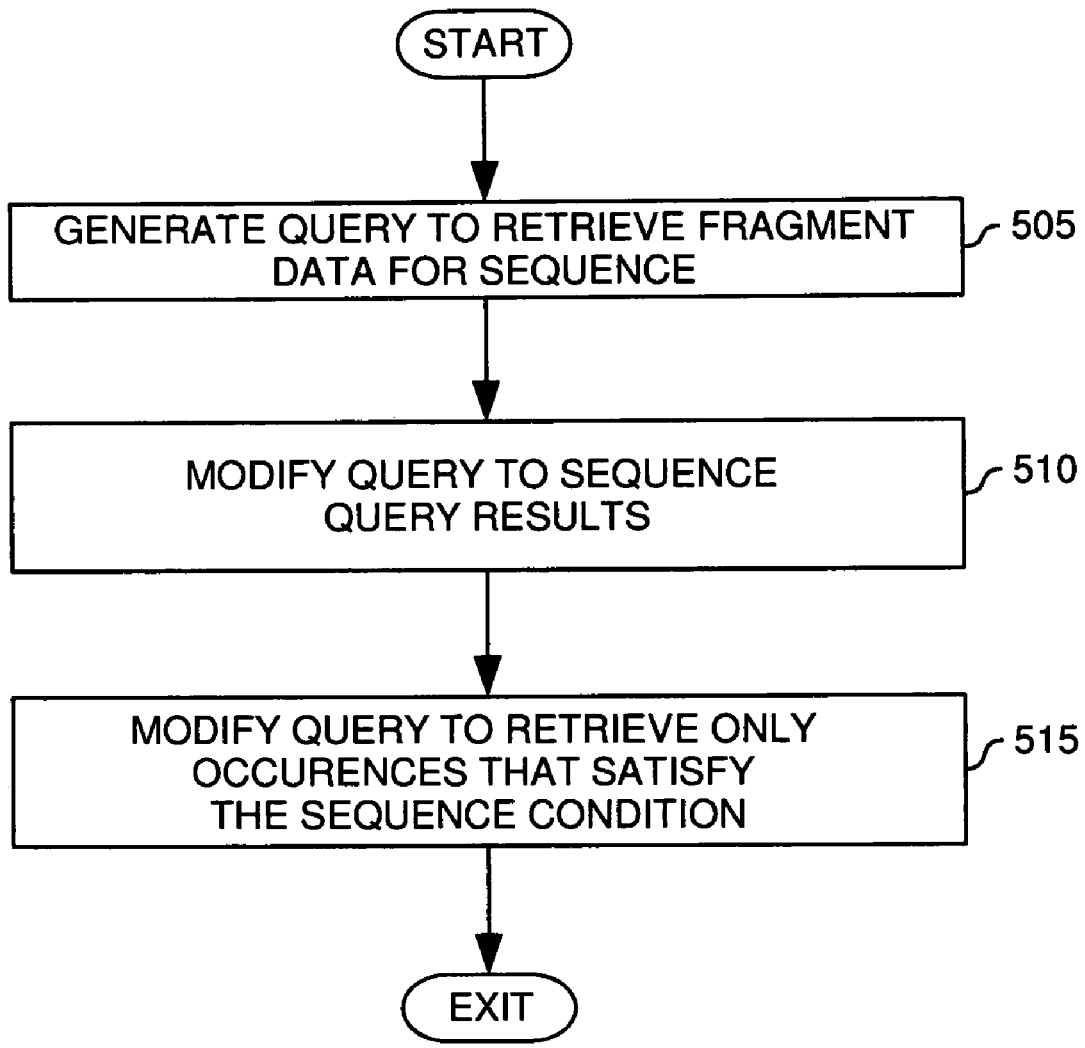
FIG. 5 illustrates a method for generating a resolved query of an underlying physical database, according to one embodiment of the invention.

FIG. 5 illustrates a method 500 for generating a resolved query of an underlying physical database from an abstract query, according to one embodiment of the invention. In this example, the method 500 operates to generate a resolved query using SQL query fragments from the abstract query "find patients with a last hemoglobin test value greater than 27.5." (This query is similar to the one illustrated in FIG. 3B with the occurrences value 345 set to "1"). At step 505, the runtime component 114 generates a query fragment to retrieve the data for the logical field 208 included in a sequence condition, or referenced by a sequence operator. That is, runtime component 114 may be configured to generate a query fragment that retrieves the unordered data using the access method 210 specified by the logical field 208 included in a sequence condition or sequence operator.

For example, the runtime component 114 may be configured to generate a query to retrieve values for the hemoglobin test (on a per patient basis) from the tests table. This table is specified by the access method for the hemoglobin_test logical field $208_3$. In an embodiment where the physical database 214 is queried using SQL, the runtime component 114 may generate an SQL query fragment such as:

AS t1 SELECT test_value. patientID from tests WHERE test_ID=1234

The above query fragment retrieves test values from the tests table for hemoglobin tests. The "SELECT test value from tests" clause corresponds to the access method specified by logical field $208_3$, and the "WHERE 'test_ID=1234'" clause corresponds to the filter specified by logical field $208_3$.

Next, at step 510, the query is modified to order query results according to the sequence metadata 215 or 218, as specified by the logical field 208. Using SQL, for example, one method to order query results is by using the "ORDER BY" clause. The above query fragment may be modified to include an ORDER BY clause such as:

AS t1 SELECT test_value, patientID FROM tests WHERE test_ID=1234 ORDER BY tests.test_date At this step, the above query fragment will retrieve the hemoglobin test values, and order them according to the sequencing metadata 218. In this example, the criteria for the "ORDER BY" clause is specified by the timeline metadata 215 provided by logical field $208_3$ for the "Hemoglobin_Test" logical field $208_3$.

At step 515 the query fragment is modified to retrieve data for the particular sequence value (e.g., first, third, $17^{th}$, top 5 etc.), or to select values against which to evaluate the sequence condition. That is, if the abstract query specified a sequence operator to return specific data elements from the sequence, then the specific data elements may be selected from the temporary table "t1" generated using the above SQL statement. For data from a specified sequence position without any conditions, this query simply retrieves the relevant rows from the temporary table "t1" generated in the above query fragment:

SELECT*FROM t1 WHERE Row_Number( )=[row number or numbers specified by query]

This query fragment selects the relevant row numbers using the sequence values provided by the abstract query.

Alternatively, where the abstract query includes a sequence condition, data from the temporary table "t1" may be evaluated to determine whether any of the data elements at the sequence positions specified by the abstract query (e.g., the last 5) satisfy the selection criteria an additional criteria may be added.

SELECT*FROM t1 WHERE Row_Number( )=[row number or numbers specified by query] AND WHERE test_value>27.5

This query fragment retrieves the row numbers specified in a sequence condition only if the condition specified by the WHERE clause is satisfied. The above SQL query fragments are greatly simplified to illustrate embodiments of the invention. For example, in order to include a particular patient's name, data from a patient demographics table would need to be included in the temporary table t1, joined with the data from the tests table data using the Patient ID as the primary key. Those skilled in the art will recognize that the above query fragments may be joined with other queries of data that do not include any sequence operations, and further, that other SQL queries, or queries composed using other query languages may be used by embodiments of the invention. Once completed, the resolved query is issued to the underlying physical database as part of operations 400. Query results are then returned to the user.

CONCLUSION

Embodiments of the invention add useful operators to the database abstraction model used for composing complex queries using simple and intuitive commands. In one embodiment, users may add sequence operators to an abstract query, or specify sequence restrictions for conditions included in an abstract query. Once a user completes composing an abstract query, a runtime component may use additional metadata included in the definition of a logical field to generate a resolved query, alternatively, if a logical field does not provide additional metadata, the query building interface may be configured to prompt a user to provide a method for sequencing data retrieved for the logical field. Thus, users are not required to compose a complex query using more primitive logical operators, or required to understand the syntax or semantics of the underlying physical query language to query data in the underlying database. Instead, users are presented with a straightforward interface for composing a query with a sequence operator or for specifying a sequence condition.

While the foregoing is directed to embodiments of the present invention, other and further embodiments of the invention may be devised without departing from the basic scope thereof, and the scope thereof is determined by the claims that follow.

What is claimed is:

1. A computer-implemented method of providing access to data in a physical database, comprising:
   providing a database abstraction model that defines a plurality of logical fields that each define: (i) a logical field name, (ii) an access method selected from at least two different access method types and (iii) a location in the physical database for accessing respective data elements in the physical database; wherein at least a first logical field further defines how to order data elements accessed for the at least one logical field, wherein the location defined by the first logical field comprises a first physical field of the physical database, wherein the first logical field defines that the data elements accessed for the first logical field are ordered based on at least one of: (i) a second logical field of the plurality of logical fields of the database abstraction model and (ii) a second physical field of the physical database;
   providing a query building interface for composing an abstract query from the plurality of logical fields in the database abstraction model, wherein the abstract query specifies which of the data elements should be retrieved based on their respective order positions without specifying how to order the data elements, the data elements being ordered as defined by the first logical field; and
   providing a runtime component configured to generate, from the abstract query and by operation of one or more computer processors, a resolved query executable against the physical database, wherein the resolved query is configured to retrieve the data elements specified by the abstract query and ordered as defined by the first logical field of the database abstraction model.

2. The method of claim 1, wherein the first logical field indicates that data elements accessed for the first logical field should be sequenced according to a chronological order.

3. The method of claim 1, wherein the first logical field indicates that the data elements accessed for the first logical field should be sequenced according to the relative magnitude of the data elements.

4. The method of claim 1, wherein the order positions include at least one of:
   an order position of a single data element, from the data elements which are ordered as defined by the first logical field, to be retrieved for the abstract query; and
   order positions of a range of data elements, from the data elements which are ordered as defined by the first logical field, to be retrieved for the abstract query.

5. The method of claim 1, wherein the abstract query further specifies that a condition included in the abstract query should only be evaluated against the data elements specified by the abstract query.

6. The method of claim 1, wherein the database abstraction model further defines a model entity, wherein the model entity is used as the logical focus of an abstract query, and wherein an identifier in the physical database is used to distinguish instances of the model entity.

7. The method of claim 6, wherein the identifier for the model entity comprises, a primary key column from a table in a relational database, and wherein instances of the model entity may be identified by entries from the primary key column.

8. The method of claim 1, wherein at least one of the logical fields has no corresponding physical field in any physical table in the physical database and the respective access method for the at least one of the logical fields calculates a value.

9. The method of claim 1, whereby the data elements are accessed from the physical database, ordered based on the database abstraction model, and selected based on the abstract query.

10. The method of claim 1, whereby the data elements are accessed from the physical database, ordered based on the database abstraction model and not based on the abstract query, and selected based on at least one of the database abstraction model and the abstract query.

11. The method of claim 1, whereby logic that orders and selects the data elements is divided between the database abstraction model and the abstract query.

12. A computer-implemented method of accessing physical data having a particular physical data representation, comprising configuring one or more computer processors to perform an operation comprising:
   receiving an abstract query issued by a requesting entity according to a query specification of the requesting entity; wherein the query specification defines an interface to the database abstraction model, wherein the database abstraction model defines a plurality of logical field definitions mapping logical fields to the physical data, wherein each of the logical field definitions comprises a logical field name, at least one location attribute identifying a location of physical data corresponding to the logical field name, and a reference to an access method selected from at least two different access method types; wherein each of the different access methods types defines a different manner of exposing the physical data corresponding to the logical field name of the respective logical field definition, wherein the logical field definition for at least a first logical field defines how to order physical data elements corresponding to the first logical field, wherein the location defined by the first logical field comprises a first physical field of a physical database storing the physical data, wherein the first logical field defines that the data elements accessed for the first logical field are ordered based on at least one of: (i) a second logical field of the plurality of logical fields of the database abstraction model and (ii) a second physical field of the physical database, and wherein the abstract query is composed on the basis of the plurality of logical field definitions; and transforming, by operation of the one or more computer processors, the abstract query into a query consistent with the particular physical data representation according to the database abstraction model depending on which of the plurality of logical fields definitions are referenced by the abstract query, wherein the abstract query specifies which of the physical data elements should be retrieved based on their respective order positions without specifying how to order the physical data elements, the physical elements being ordered as defined by the first logical field.

13. The method of claim 12, wherein a first access method type is a simple access method defining a direct relationship between physical data located at a location identified by a respective location attribute of a respective logical field definition; and wherein a second access method type is a filtered access method defining a filter applied to physical data located at a location identified by a respective location attribute of a respective logical field definition, wherein the filter removes selected data from the physical data so that only a subset of the physical data is exposed by the respective logical field definition referencing the filtered access method.

14. The method of claim 12, wherein a first access method type comprises a filtered access method defining a filter applied to physical data located at a location identified by a respective location attribute of a respective logical field definition, wherein the filter removes selected data from the physical data so that only a subset of the physical data is exposed by the respective logical field definition referencing the filtered access method.

15. The method of claim 12, wherein a first access method type comprises a composed access method defining an expression applied to physical data located at a location identified by a respective location attribute of a respective logical field definition, wherein application of the expression produces values different from the physical data to which the expression is applied.

16. The method of claim 12, wherein the first logical field indicates that the physical data corresponding to the at least one logical field are to be sequenced according to a chronological order.

17. The method of claim 12, wherein the first logical field indicates the physical data corresponding to the first logical field are to be sequenced according to the relative magnitude of the physical data elements.

18. The method of claim 12, wherein specifying the order positions include at least one of:

an order position of a single physical data element, from the ordered sequence, to be retrieved for the abstract query; and order potions of a range of physical data elements, from the ordered sequence, to be retrieved for the abstract query.

19. The method of claim 12, wherein the abstract query further specifies that a condition included in the abstract query should only be evaluated against the data elements specified by the abstract query.

20. The method of claim 12, wherein at least one of the logical fields has no corresponding physical field in any physical table in the physical database and the respective access method for the at least one of the logical fields calculates a value.

21. The method of claim 12, whereby the data elements are: (i) accessed from a physical database storing the physical data; (ii) ordered based on the database abstraction model; and (iii) selected based on the abstract query.

22. The method of claim 12, whereby the data elements are accessed from a physical database storing the physical data; (ii) ordered based on the database abstraction model and not based on the abstract query; and (iii) selected based on at least one of the database abstraction model and the abstract query.

23. The method of claim 12, whereby logic that orders and selects the data elements is divided between the database abstraction model and the abstract query.

* * * * *